US012728762B2

(12) United States Patent
Tuller et al.

(10) Patent No.: US 12,728,762 B2
(45) Date of Patent: Sep. 8, 2026

(54) HYBRID VEHICLE CHARGING INCLUDING DURING STANDSTILL OR NEUTRAL GEAR OPERATING STATES

(71) Applicant: FCA US LLC, Auburn Hills, MI (US)

(72) Inventors: Zachary L Tuller, Grand Rapids, MI (US); Gaurav S Sadekar, Rochester Hills, MI (US); Nadirsh D Patel, Farmington Hills, MI (US); Indrasen S Karogal, Auburn Hills, MI (US); Alessandro Lelli, Turin (IT); Dario Morina, Turin (IT); Pier Luca Di Gristina, Turin (IT); Paolo Olivieri, Pecello Torinese (IT); Ashay Sharma, Troy, MI (US); Frederico de Bosio, Turin (IT); Giuseppe Corallo, Turin (IT)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/432,468

(22) Filed: Feb. 5, 2024

(65) Prior Publication Data

US 2024/0262243 A1 Aug. 8, 2024

Related U.S. Application Data

(60) Provisional application No. 63/483,609, filed on Feb. 7, 2023.

(51) Int. Cl.
*B60L 58/20* (2019.01)
*B60K 6/387* (2007.10)
(Continued)

(52) U.S. Cl.
CPC .............. *B60L 58/12* (2019.02); *B60K 6/387* (2013.01); *B60K 6/48* (2013.01); *B60L 58/20* (2019.02);
(Continued)

(58) Field of Classification Search
CPC ...... B60L 58/12; B60L 58/20; B60L 2260/22; B60W 20/00; B60K 6/387; B60K 6/48
See application file for complete search history.

(56) References Cited

U.S. PATENT DOCUMENTS

| | | | | |
|---|---|---|---|---|
| 2010/0125020 A1* | 5/2010 | Ikegami | B60L 58/12 475/5 |
| 2018/0244169 A1* | 8/2018 | Meyer | B60L 15/2054 |
| 2024/0067160 A1* | 2/2024 | Kharpuri | B60L 3/04 |

FOREIGN PATENT DOCUMENTS

| | | | |
|---|---|---|---|
| DE | 102017126231 A1 * | 5/2019 | B60W 20/17 |
| DE | 102016200819 B4 * | 1/2024 | B60W 10/02 |
| EP | 3604011 A1 * | 2/2020 | B60K 6/26 |

* cited by examiner

*Primary Examiner* — Tisha D Lewis
(74) *Attorney, Agent, or Firm* — Jeremy J. Klobucar

(57) ABSTRACT

A mild hybrid electric vehicle includes an engine; a low voltage electric starter/generator motor of a belt-driven starter/generator (BSG) unit connected to a crankshaft of the engine, wherein the electric starter/generator motor is powered by a low voltage battery system; a hybrid dual clutch transmission (DCT) coupled to an output of the engine, wherein the DCT includes an electric traction motor; and a control system configured to control the engine, the dual clutch hybrid transmission and the electric traction motor to charge the high voltage battery system while the vehicle is in a standstill condition or a neutral gear state and the low voltage motor of the BSG unit is not used to charge the high voltage battery.

12 Claims, 2 Drawing Sheets

(51) Int. Cl.
*B60K 6/48* (2007.10)
*B60L 58/12* (2019.01)
*B60W 20/00* (2016.01)

(52) U.S. Cl.
CPC .......... *B60W 20/00* (2013.01); *B60L 2260/22* (2013.01); *B60Y 2200/92* (2013.01)

HYBRID VEHICLE CHARGING INCLUDING DURING STANDSTILL OR NEUTRAL GEAR OPERATING STATES

CROSS-REFERENCE TO RELATED APPLICATION(S)

The present application claims the benefit of U.S. Provisional Patent Application No. 63/483,609, filed on Feb. 7, 2023. The disclosure of this application is incorporated herein by reference in its entirety.

FIELD

The present application generally relates to hybrid electric vehicles and, more particularly, to systems, methods and techniques for charging a mild hybrid electric vehicle during standstill or neutral gear operating states.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In certain conventional hybrid vehicle powertrain architectures, it may not be possible to charge a high voltage battery when the vehicle is at a standstill or in a neutral condition. One such example would be where the vehicle utilizes a P1fP2 or P1fP2.5 architecture where the front electric motor (P1f) is a low voltage motor, such as a 12V electric motor. In these situations where a low voltage P1 or P1f electric motor is utilized and optionally with a unidirectional DC/DC converter, it is not possible to charge the high voltage battery when the vehicle is operating at a standstill and/or the vehicle transmission is in a neutral gear state.

Without a charging option during these vehicle states, the high voltage battery could be depleted when accessory loads are present, for example. Previous solutions to address this situation include utilizing a high voltage P1/P1f electric motor, which is capable of charging the high voltage battery when the vehicle is operating at the standstill and/or the vehicle transmission is in the neutral gear state. This solution, however, increases vehicle cost and complexity and may reduce the overall efficiency of the electrified powertrain. Accordingly, while such conventional hybrid vehicle charging techniques do work for their intended purpose, there exists an opportunity for improvement in the relevant art.

SUMMARY

According to one example aspect of the invention, a mild hybrid electric vehicle is provided. In one exemplary implementation, the mild hybrid electric vehicle includes: an engine; a low voltage electric starter/generator motor of a belt-driven starter/generator (BSG) unit connected to a crankshaft of the engine, the electric starter/generator motor being powered by a low voltage battery system; a hybrid dual clutch transmission coupled to an output of the engine and having: a first sub-transmission associated with a first clutch and a first synchronizer; a second sub-transmission associated with a second clutch and a second synchronizer;

and a high voltage electric traction motor rotationally coupled to the second sub-transmission, the electric traction motor electrically coupled to an AC/DC converter, a unidirectional DC/DC boost converter and a high voltage battery system. The mild hybrid vehicle includes a control system configured to control the engine, the dual clutch hybrid transmission and the electric traction motor to charge the high voltage battery system while i) the vehicle is in a standstill condition or a neutral gear state, and ii) the low voltage motor of the BSG unit is not used to charge the high voltage battery.

In some implementations, the first and second synchronizers are controlled by the control system to couple and decouple the respective first and second sub-transmissions to/from the driveline; and the first and second clutches are controlled by the control system to couple and decouple the respective first and second sub-transmissions to/from the engine.

In some implementations, the electric traction motor is coupled to the second sub-transmission downstream of the second clutch and upstream of the second synchronizer.

In some implementations, the control system includes a hybrid control unit and a transmission control unit, and wherein the hybrid control unit operates as a master controller over the transmission control unit.

In some implementations, the low voltage battery is a 12 Volt (V) battery, and wherein the high voltage battery is a 48 V battery.

In some implementations, the control system controlling the engine, the dual clutch hybrid transmission and the electric traction motor to charge the high voltage battery system includes the control system: receiving a charging request for the high voltage battery; controlling the second synchronizer to an open state thereby disconnecting the second sub-transmission from the wheels; controlling the second clutch to a closed or engaged position thereby rotatably connecting the engine to the second sub-transmission; and controlling the engine to output an amount of engine torque equal to or substantially equal to a corresponding amount of negative torque applied to the electric traction motor to use the electric traction motor to charge the high voltage battery system while the vehicle is at the standstill condition.

In some implementations, the hybrid control unit requests actuation of transmission control unit to control the second clutch and the corresponding amount of negative torque applied to the electric traction motor; and wherein the transmission control unit acknowledges this request by indicating via an enumerated state that is specific to this mode with the second sub-transmission in an open or neutral state. In some implementations, the enumerated state is a shift type signal that the transmission control unit sends to the hybrid control unit.

In some implementations, the mild hybrid electric vehicle includes the control system controlling: the first clutch to an open or neutral position thereby decoupling the first sub-transmission from the engine; and the first synchronizer to an open or neutral position thereby decoupling the first sub-transmission from the wheels.

In some implementations, the mild hybrid electric vehicle includes the control system controlling: the first clutch to an open or neutral position thereby decoupling the first sub-transmission from the engine; and the first synchronizer to an engaged position thereby coupling the first sub-transmission at a selected gear to the wheels.

In some implementations, the mild hybrid electric vehicle includes the control system controlling: the first clutch to a closed or engaged state thereby coupling the first sub-transmission to the engine; and the first synchronizer to an engaged position thereby coupling the first sub-transmission at a selected gear of first gear to the wheels, wherein the standstill condition includes a vehicle speed greater than zero KM/h but less than 5 km/h to thereby facilitate charging the high voltage battery system via the electric traction motor while the vehicle is moving.

In some implementations, the hybrid control unit requests actuation of transmission control unit; and the transmission control unit acknowledges this request by indicating via an enumerated state specific to this mode with the first sub-transmission in an engaged state. In some implementations, the enumerated state is a shift type signal that the transmission control unit sends to the hybrid control unit.

In some implementations, the mild hybrid electric vehicle includes a vehicle launch assist mode where the control system is configured to: control the second clutch to a closed position to rotationally couple the engine and the electric traction motor to each other; control the second synchronizer to the neutral position; control the first clutch to the closed or engaged state; and control the first sub-transmission to engage first gear, through which the vehicle is configured to launch using combined torque from the engine and the electric traction motor using a higher gear ratio associated with first gear of the first sub-transmission.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, wherein.

DESCRIPTION

As previously discussed, certain conventional mild hybrid electric vehicle charging systems do not have the capability to efficiently charge a high voltage battery when the vehicle is at a standstill or the transmission is in a neutral gear state. This is typically because the electrified powertrain architecture utilizes a low voltage P1f electric motor and/or a unidirectional DC/DC boost converter as opposed to other conventional solutions that use a high voltage P1/P1F motor in addition to the high voltage P2 motor.

Accordingly, improved hybrid vehicle charging systems, methods and/or techniques are presented. These techniques improve the hybrid vehicle's ability to charge the high voltage battery using a new control strategy, even when the electrified powertrain incorporates a low voltage P1f electric motor and a unidirectional DC/DC converter for the high voltage battery system.

Figure 1:
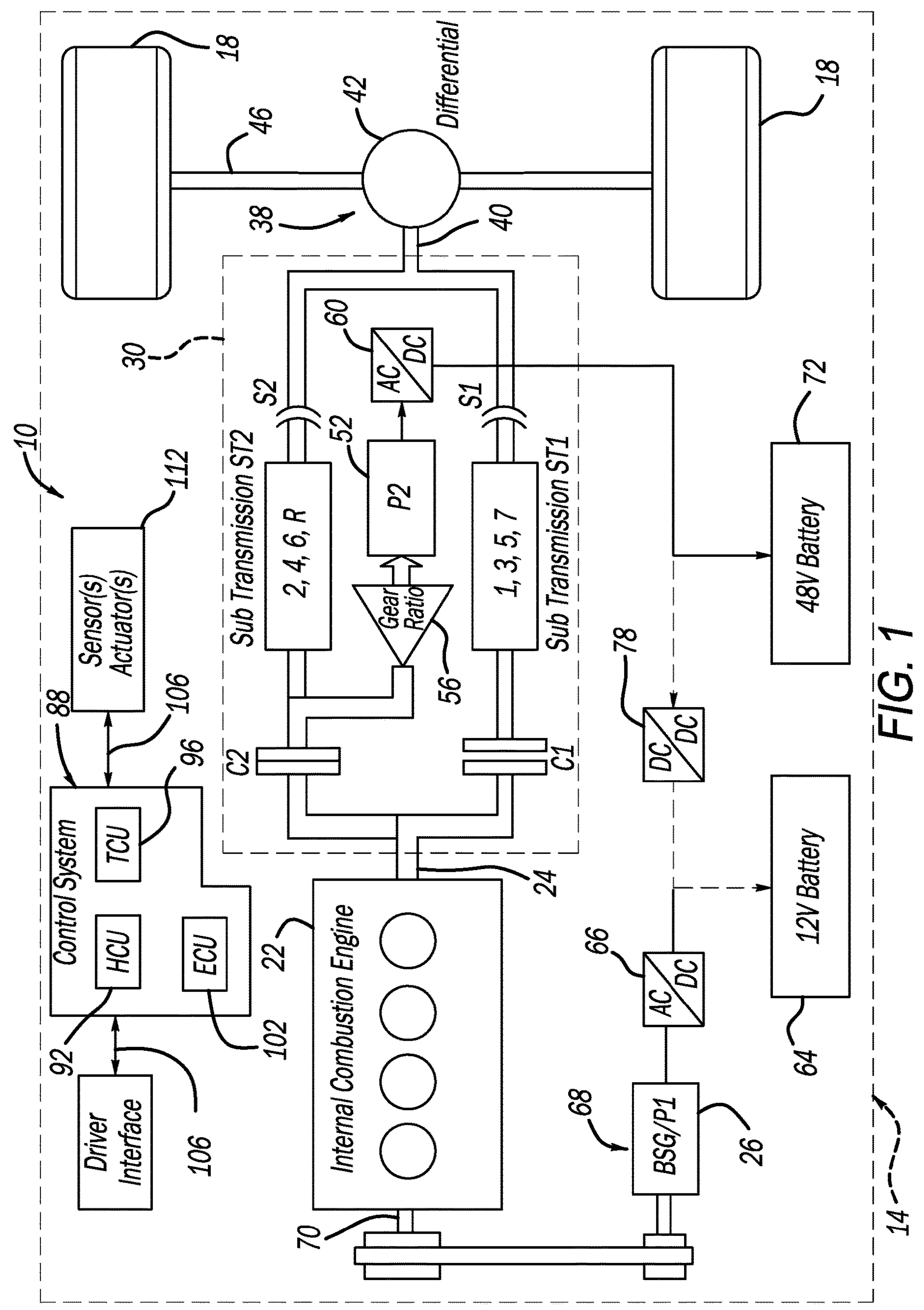
FIG. 1 illustrates an example schematic representation of a mild hybrid electric vehicle powertrain/driveline architecture including a dual clutch hybrid transmission according to the principles of the present application.

FIG. 1 illustrates an example mild hybrid powertrain architecture 10 for an example mild hybrid electric vehicle 14. It will be appreciated that while only two wheels 18 of the vehicle are illustrated, the vehicle 14 may 14 may include four or more wheels, as may be desired. In the example vehicle shown, the hybrid powertrain architecture 10 includes an engine 22, a first electric motor 26 rotationally coupled thereto, a hybrid dual clutch transmission 30 coupled to the engine 22 via an output and to a driveline system 38.

In the example architecture illustrated, the engine 22 may be an internal combustion engine 22 and may include four cylinders. It will be appreciated, however, that the engine 22 may include various configurations and number of cylinders, such as a v-type configuration and six or eight cylinders, for example. The driveline system 38 may include various components including, for example, a driveshaft 40 an electric drive module or differential 42, a rear axle 46 and the rear wheels 18. While the example architecture illustrates the differential 42, it will be appreciated that other components, such as the electric drive module, may also be utilized.

The dual clutch hybrid transmission 30 includes, in general, dual clutches C1 and C2 associated with respective internal sub-transmissions ST1 and ST2. In the example illustrated, odd transmission gears are associated with sub-transmission ST1 and even gears are associated with sub-transmission ST2. Each sub-transmission ST1, ST2 also includes controllable synchronizers S1, S2 that include the capability to, among other things, couple and decouple the sub-transmissions ST1, ST2 from the driveline system 38. A P2 or P2.5 high voltage electric motor 52 is provided in or associated with the dual clutch transmission 30 and may be associated with a gear reducer 56 and an AC/DC converter 60.

The hybrid powertrain may be in the form of the mild hybrid electric vehicle powertrain discussed above and may include a low voltage battery or battery system 64, such as a 12V battery, which may be associated with a belt starter generator (BSG) unit 68. The BSG unit 68 includes the low voltage P1f motor 26 which is powered by the low voltage battery 64 through an AC/DC converter 66. The BSG unit 68 is coupled to the engine 22, typically via a crankshaft 70. The high voltage P2 motor 52 is electrically coupled to and powered by a high voltage battery or battery system 72 and is also electrically coupled to the AC/DC converter 60 and a DC/DC boost converter 78. In one example implementation, the DC/DC boost converter 78 is a unidirectional DC/DC converter and this together with the low voltage p1f motor 26 of the BSG unit 68 prevents the BSG unit 68 from being able to provide charging for the high voltage battery system 72.

The hybrid powertrain also includes a control system 88. In one example implementation, the control system 88 includes a hybrid controller or control unit (HCU) 92, a transmission controller or control unit (TCU) 96 and an engine controller or control unit (ECU) 102 in communication with the various components and systems of the hybrid vehicle powertrain and each other via a communication network 106, such as CAN communication. In one exemplary implementation, the HCU 92 also functions or serves as a master controller over the other control units, including the TCU 96. The HCU 92 and TCU 96 may be collectively referred to herein individually or as the control system 88.

While the discussion will continue with reference to the example mild hybrid electric vehicle architecture 10 shown in FIG. 1, it will be appreciated that the control strategies and associated systems, methods and/or techniques discussed herein apply to vehicles having somewhat different architectures while still including an internal combustion engine, a P2 electric motor, a unidirectional DC/DC boost converter, a low voltage P1f electric motor, an energy storage system, and a gear transmission with controllable connections to the engine and a vehicle driveline.

Figure 2:
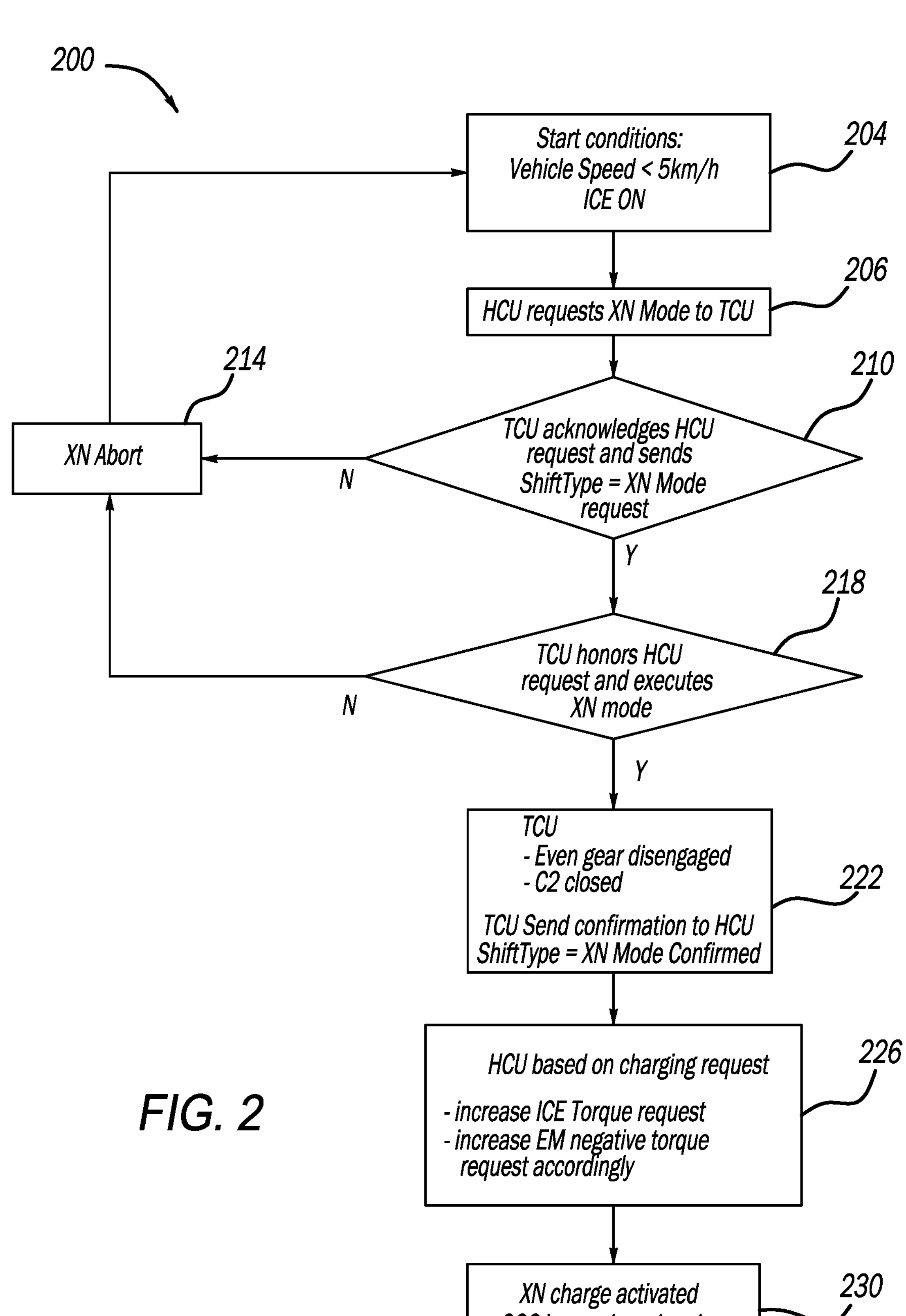
FIG. 2 is a flow diagram of an example mild hybrid vehicle charging system and method according to the principles of the present application.

With continued reference to FIG. 1 and additional reference to FIG. 2, a high-level overview of the unique control strategy, termed XN mode, will now be discussed followed with further detail. As an overview, the HCU 92 includes a control algorithm (XN mode) which interacts with the TCU 96 via a series of handshake signals to honor and implement a standstill charging request by i) disconnecting the even gear sub transmission ST2 from the driveline system 38 by commanding opening of the even gear synchronizer S2, and ii) to connecting the engine 22 directly to the P2 electric motor 52 associated with sub-transmission ST2 by commanding clutch C2 to a closed or engaged state. This provides for charging the high voltage battery 72 and supporting DC loads when the vehicle 14 is in a standstill condition or operating state. This also provides for, among other things, an ability to charge the high voltage battery 72 though the P2 electric motor and thus eliminate the need for a high voltage P1 motor for a vehicle architecture as shown in FIG. 1. In other words, a less expensive P1f low voltage motor can be utilized with a less expensive low voltage battery associated therewith in the mild hybrid vehicle architecture 18 while still providing for charging of the high voltage battery 72 during vehicle standstill or neutral gear state conditions.

In more detail, a charging request is received and the HCU 92 determines at 204 if certain entry or start conditions are satisfied to commence XN mode. Such conditions may include, for example, confirmation that the vehicle speed is zero km/h or less than five km/h and the engine 22 is in an on state. At 206, the HCU 92 commands or request XN mode to the TCU 96. At 210, the TCU acknowledges or rejects the XN mode request. If the TCU 96 rejects the XN mode request, then the XN mode is aborted at 214 and the process returns to block 204. If the TCU 96 acknowledges the XN mode request, the TCU 96 sends out appropriate control signals, such as shift type signals, to the HCU 92.

At 218, the TCU 96 determines whether the XN mode can be honored. If no, then the XN mode is aborted at 214 and the process returns to block 204. If yes, at 222 the TCU 96 honors the XN mode request and through the shift type signals, the TCU 96 communicates in a unique manner with the HCU 92 to have the dual clutch transmission 30 open the second synchronizer S2 of sub-transmission ST2 and/or place the same in a neutral state (even gear disengaged) and close or engage the clutch C2. This, in essence, decouples sub-transmission ST2 from the front wheels or wheels 18 and couples sub-transmission ST2 and traction motor 52 to the engine 22. Once completed, the TCU 96 then sends confirmation to the HCU 92.

At 226, the HCU 92 then confirms opening (neutral state) of the synchronizer S2 and locking of clutch C2 based upon slip speed and clutch status signals from appropriate sensors 112. With clutch C2 being engaged and the subject synchronizer S2 being in the neutral state, the HCU 96, based on the charging request received, increases positive engine torque of engine 22 and, by a substantially equal or equal amount, applies negative torque on the P2 electric traction motor 52 to satisfy the charging request for the high voltage battery 72. At 230, XN mode charging is activated and a state of charge of the battery 230 is monitored.

With this control strategy, in one exemplary implementation, the HCU 96 can essentially always allow standstill charging via the P2 motor 52, even with the hybrid vehicle architecture 18 having the low voltage P1f electric motor 26 and the unidirectional DC/DC converter 78. In this charging and vehicle operating scenario, only the P2 motor 52 is used to charge the battery 72.

It was also discovered that this control strategy can also be requested/executed during low-speed vehicle driving maneuvers (e.g., less than 5 kmph) where the odd gear sub-transmission ST1 (via 1$^{st}$ gear) is connected to the wheels 18 and, by using the even sub-transmission ST2 in the manner discussed above, the high voltage battery 72 can still be charged. The XN mode configuration can also be utilized as a backup engine start option via P2 electric motor during cold conditions.

During the XN mode control strategy development, it was also realized that, from a drivability perspective, vehicle launch using the XN mode control strategy (now termed herein as XN Boost or launch assist mode) is improved over launch of the vehicle when not in the XN mode. For example, during the XN mode, both the P2 electric motor and internal combustion engine are connected to each other via clutch C2 of sub-transmission ST2, and first gear is engaged on the sub transmission ST1. Synchronizer S2 is controlled to the neutral state. This configuration realizes the benefit of higher gear ratios associated with first gear for launch under the combined power of the engine 22 and electric traction motor 52 as compared to a regular dual clutch transmission launch where the engine 22 is connected to 1st gear of sub transmission ST1 and the electric traction motor 52 is connected to second gear of the sub transmission ST2.

Further, while driving in higher gears (e.g., seventh gear) using the XN mode control strategy (e.g., sub transmission ST1 connected to seventh gear & sub transmission ST2 being in neutral) also provides benefits, such as friction losses from a transmission even gear can be avoided and more efficient or cost-effective driving can be realized.

In summary, the systems and methods discussed herein provide for using a P1f/P2 or P1f/P2.5 hybrid vehicle architecture where the P1f motor is a low voltage motor, and also charging the high voltage battery at vehicle standstill conditions where a unidirectional DC/DC boost converter is utilized as opposed to a bidirectional DC/DC boost converter. Stated differently, instead of using two high voltage motors like P1P2 & P1P4 vehicle architectures, one low voltage (e.g., 12V) BSG electric motor is used as the starting device and one high voltage electric motor P2 is utilized as a traction and charging motor, which results in similar functionalities like standstill charging, boost & engine starts are achieved using the XN mode control strategy.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It will be appreciated that the term "controller" or "control system" (as well as "module" and "unit") as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Some portions of the above description may present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mild hybrid electric vehicle, comprising:

an engine;

a low voltage electric starter/generator motor of a belt-driven starter/generator (BSG) unit connected to a crankshaft of the engine, the electric starter/generator motor being powered by a low voltage battery system;

a hybrid dual clutch transmission coupled to an output of the engine and having:

a first sub-transmission associated with a first clutch and a first synchronizer;

a second sub-transmission associated with a second clutch and a second synchronizer; and a high voltage electric traction motor rotationally coupled to the second sub-transmission, the electric traction motor electrically coupled to an AC/DC converter, a unidirectional DC/DC boost converter and a high voltage battery system; and a control system configured to control the engine, the dual clutch hybrid transmission and the electric traction motor to charge the high voltage battery system while i) the vehicle is in a standstill condition or a neutral gear state, and ii) the low voltage motor of the BSG unit is not used to charge the high voltage battery;

wherein the first and second synchronizers are controlled by the control system to couple and decouple the respective first and second sub-transmissions to/from the driveline;

wherein the first and second clutches are controlled by the control system to couple and decouple the respective first and second sub-transmissions to/from the engine; and wherein the electric traction motor is coupled to the second sub-transmission downstream of the second clutch and upstream of the second synchronizer.

2. The mild hybrid electric vehicle of claim 1, wherein the control system includes a hybrid control unit and a transmission control unit, and wherein the hybrid control unit operates as a master controller over the transmission control unit.

3. The mild hybrid electric vehicle of claim 1, wherein low voltage battery is a 12 Volt (V) battery, and wherein the high voltage battery is a 48 V battery.

4. The mild hybrid electric vehicle of claim 1, wherein the control system controlling the engine, the dual clutch hybrid transmission and the electric traction motor to charge the high voltage battery system includes the control system:

receiving a charging request for the high voltage battery;

controlling the second synchronizer to an open state thereby disconnecting the second sub-transmission from the wheels;

controlling the second clutch to a closed or engaged position thereby rotatably connecting the engine to the second sub-transmission; and controlling the engine to output an amount of engine torque equal to or substantially equal to a corresponding amount of negative torque applied to the electric traction motor to use the electric traction motor to charge the high voltage battery system while the vehicle is at the standstill condition.

5. The mild hybrid electric vehicle of claim 4, where the hybrid control unit requests a mode including actuation of transmission control unit to control the second clutch and the corresponding amount of negative torque applied to the electric traction motor; and wherein the transmission control unit acknowledges this request by indicating via an enumerated state that is specific to this mode with the second sub-transmission in an open or neutral state.

6. The mild hybrid electric vehicle of claim 5, wherein the enumerated state is a signal that the transmission control unit sends to the hybrid control unit.

7. The mild hybrid electric vehicle of claim 4, further comprising the control system controlling:

the first clutch to an open or neutral position thereby decoupling the first sub-transmission from the engine; and the first synchronizer to an open or neutral position thereby decoupling the first sub-transmission from the wheels.

8. The mild hybrid electric vehicle of claim 4, further comprising the control system controlling:

the first clutch to an open or neutral position thereby decoupling the first sub-transmission from the engine; and the first synchronizer to an engaged position thereby coupling the first sub-transmission at a selected gear to the wheels.

9. The mild hybrid electric vehicle of claim 4, further comprising the control system controlling:

the first clutch to a closed or engaged state thereby coupling the first sub-transmission to the engine; and the first synchronizer to an engaged position thereby coupling the first sub-transmission at a selected gear of first gear to the wheels, wherein the standstill condition includes a vehicle speed greater than zero KM/h but less than 5 km/h to thereby facilitate charging the high voltage battery system via the electric traction motor while the vehicle is moving.

10. The mild hybrid electric vehicle of claim 9, where the hybrid control unit requests a mode including actuation of transmission control unit; and wherein the transmission control unit acknowledges this request by indicating via an enumerated state specific to this mode with the first sub-transmission in an engaged state.

11. The mild hybrid electric vehicle of claim 10, wherein the enumerated state is a signal that the transmission control unit sends to the hybrid control unit.

12. The mild hybrid electric vehicle of claim 1, further comprising a vehicle launch assist mode where the control system is configured to:

control the second clutch to a closed position to rotationally couple the engine and the electric traction motor to each other;

control the second synchronizer to the neutral position;

control the first clutch to the closed or engaged state; and control the first sub-transmission to engage first gear, through which the vehicle is configured to launch using combined torque from the engine and the electric traction motor using a higher gear ratio associated with first gear of the first sub-transmission.

* * * * *